US012724733B2

(12) United States Patent
Wood et al.

(10) Patent No.: US 12,724,733 B2
(45) Date of Patent: Sep. 1, 2026

(54) ERASING DATA SETS WITHOUT ACCESS DELAY TO OTHER DATA SETS

(71) Applicant: International Business Machines Corporation, Armonk, NY (US)

(72) Inventors: Carrie Beth Wood, Santa Fe, NM (US); David C. Reed, Tucson, AZ (US); Susan van Berkel, Ottawa (CA); Michael Steven Gagner, Pima, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/955,732

(22) Filed: Nov. 21, 2024

(65) Prior Publication Data

US 2026/0140897 A1 May 21, 2026

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC .............................. G06F 13/28; G06F 2213/28
See application file for complete search history.

(56) References Cited

U.S. PATENT DOCUMENTS 5,193,184 A 3/1993 Belsan et al.
6,622,177 B1 * 9/2003 Eilert .................... G06F 13/387 710/52
7,694,096 B2 * 4/2010 Haustein .............. G11B 27/322 360/60
8,918,651 B2 12/2014 Greco et al.
9,483,397 B2 * 11/2016 Wakchaure ......... G11C 11/5635
9,639,463 B1 * 5/2017 Kankani ............. G06F 12/0261
9,830,099 B1 * 11/2017 Johansson ............. G06F 3/0623
9,971,899 B2 5/2018 Rabasco et al.
10,467,431 B2 11/2019 Yun
10,978,097 B1 4/2021 Paveza et al.
11,449,265 B2 9/2022 Boddu et al.
(Continued)

OTHER PUBLICATIONS

"CIS Benchmarks List", Centre for Internet Security, retrieved from web dated Dec. 30, 2024, 10 pages.
(Continued)

*Primary Examiner* — Henry Tsai
*Assistant Examiner* — Aurangzeb Hassan
(74) *Attorney, Agent, or Firm* — Steven M. Bouknight

(57) ABSTRACT

A method, according to one embodiment, includes causing an erase operation to be performed for a first data set. The erase operation includes blocking accesses to the first data set and to a locational data structure for a first volume of a first direct-access storage device (DASD) that includes the first data set, updating a bitmap of the first DASD to indicate that data tracks of the first data set are to be erased, and providing first data to a server configured to erase the data tracks of the first data set. The erase operation further includes unblocking accesses to the locational data structure, where an entry for the first data set is removed from the locational data structure prior to the unblocking. The erase operation also includes causing the data tracks of the first data set to be erased by the server during a determined erase period.

17 Claims, 4 Drawing Sheets

(56) References Cited

U.S. PATENT DOCUMENTS

| | | | | |
|---|---|---|---|---|
| 11,750,641 | B2 | 9/2023 | Jones et al. | |
| 2002/0105829 | A1* | 8/2002 | Akamatsu | G11C 16/30 365/185.18 |
| 2014/0052893 | A1 | 2/2014 | Zhang et al. | |
| 2014/0229693 | A1* | 8/2014 | Johnson | G06F 3/0608 711/162 |
| 2017/0123716 | A1* | 5/2017 | Erdmann | G06F 3/0604 |
| 2019/0051346 | A1* | 2/2019 | Zeng | G11C 16/14 |
| 2020/0301903 | A1* | 9/2020 | Barry | G06F 16/2282 |
| 2025/0199720 | A1* | 6/2025 | Shahu | G06F 3/067 |

OTHER PUBLICATIONS

"Security Technical Implementation Guides (STIGs)", DOD Cyber Exchange Public, retrieved from web dated Dec. 12, 2024, 4 pages.

Disclosed Anonymously, IP.com No. IPCOM000244144D "Method and System for Facilitating Availability of Deleted Data Blocks Using Secured Fast Replication Mechanism", Nov. 13, 2015, 8 pages.

Gwatking J.C. "Automatic Erasure of Released Disk Space on An IBM 370 Computer Using the Mvs Operating System", Department of Defence, Defence Science and Technology Organisation, Electronics Research Laboratory, Jun. 1980, 38 pages.

IBM, "Cvaffilt Macro Overview and Specification", IBM Documentation, Jun. 25, 2021, 3 pages.

IBM, "Using the DADSM/CVAF enhancements", IBM Documentation, Apr. 30, 2021, 2 pages.

* cited by examiner

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

DATA SET ERASE CODE

150

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

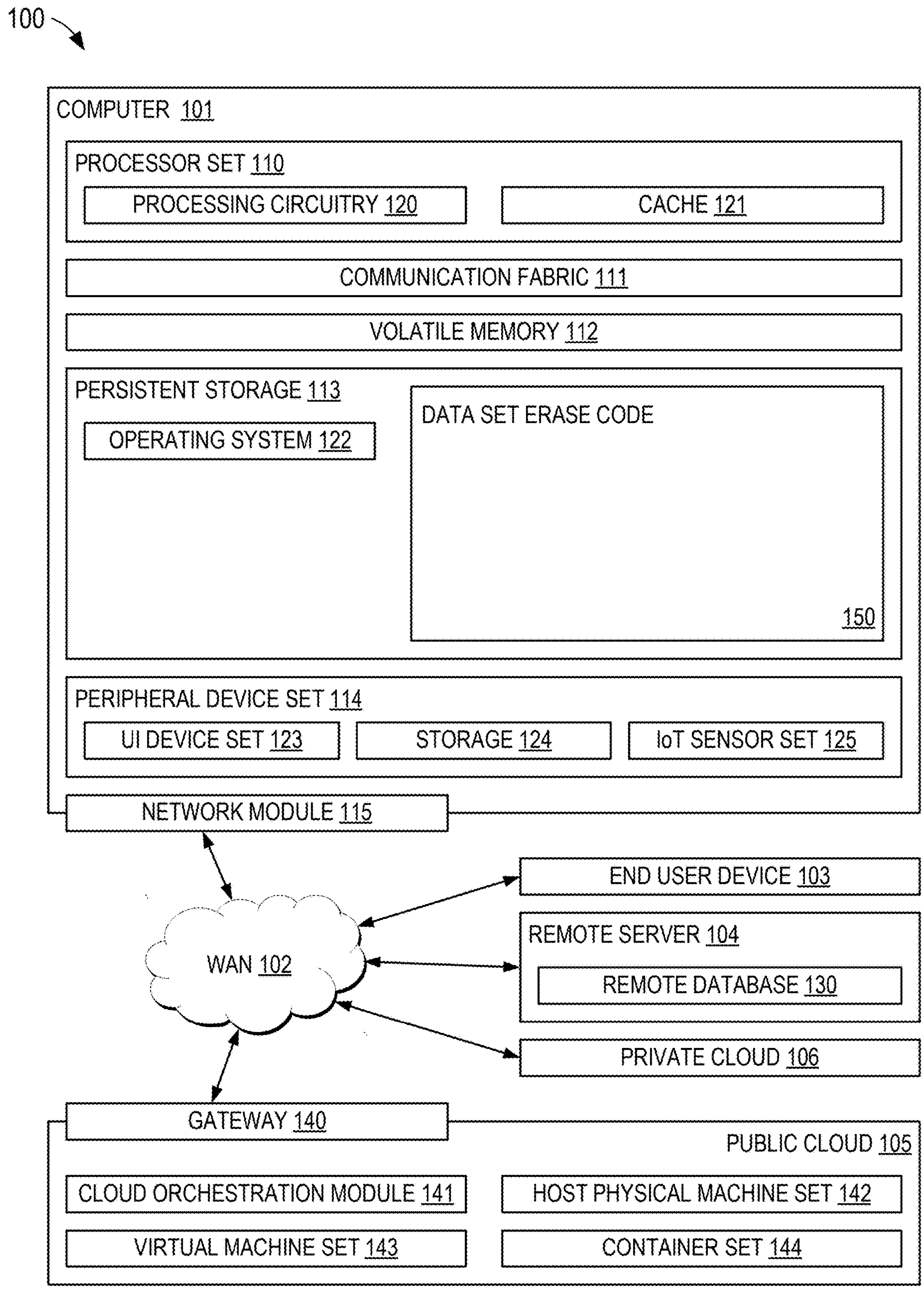

FIG. 1

ERASING DATA SETS WITHOUT ACCESS DELAY TO OTHER DATA SETS

BACKGROUND

The present invention relates to data storage environments, and more specifically, this invention relates to erasing data sets.

Data is typically stored by data drives as a plurality of bits on data storage devices, e.g., zeros and ones. In some cases, in order to erase such data, memory blocks that store the bits are marked for reclamation, and overwritten by new data. However, in order to satisfy client demands and/or governing practices for data storage, in some cases when a client uses a user device to issue a request for erasing data, e.g., specifies "ERASE(ALL)", all data must be converted to binary zeros when it is deleted. This practice is also known as "erase on scratch".

SUMMARY

A method, according to one embodiment, includes causing an erase operation to be performed for a first data set. The erase operation includes blocking accesses to the first data set and to a locational data structure for a first volume of a first direct-access storage device (DASD) that includes the first data set, updating a bitmap of the first DASD to indicate that data tracks of the first data set are to be erased, and providing first data to a server configured to erase the data tracks of the first data set. The erase operation further includes unblocking accesses to the locational data structure for the first volume of the first DASD, where an entry for the first data set is removed from the locational data structure for the first volume of the first DASD prior to the unblocking. The erase operation also includes causing the data tracks of the first data set to be erased by the server during a determined erase period.

A computer program product, according to another embodiment, includes one or more computer-readable storage media, and program instructions stored on the one or more storage media to perform the foregoing method.

A computer system, according to another embodiment, includes a processor set, one or more computer-readable storage media, and program instructions stored on the one or more storage media to cause the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

DETAILED DESCRIPTION

Figure 2:
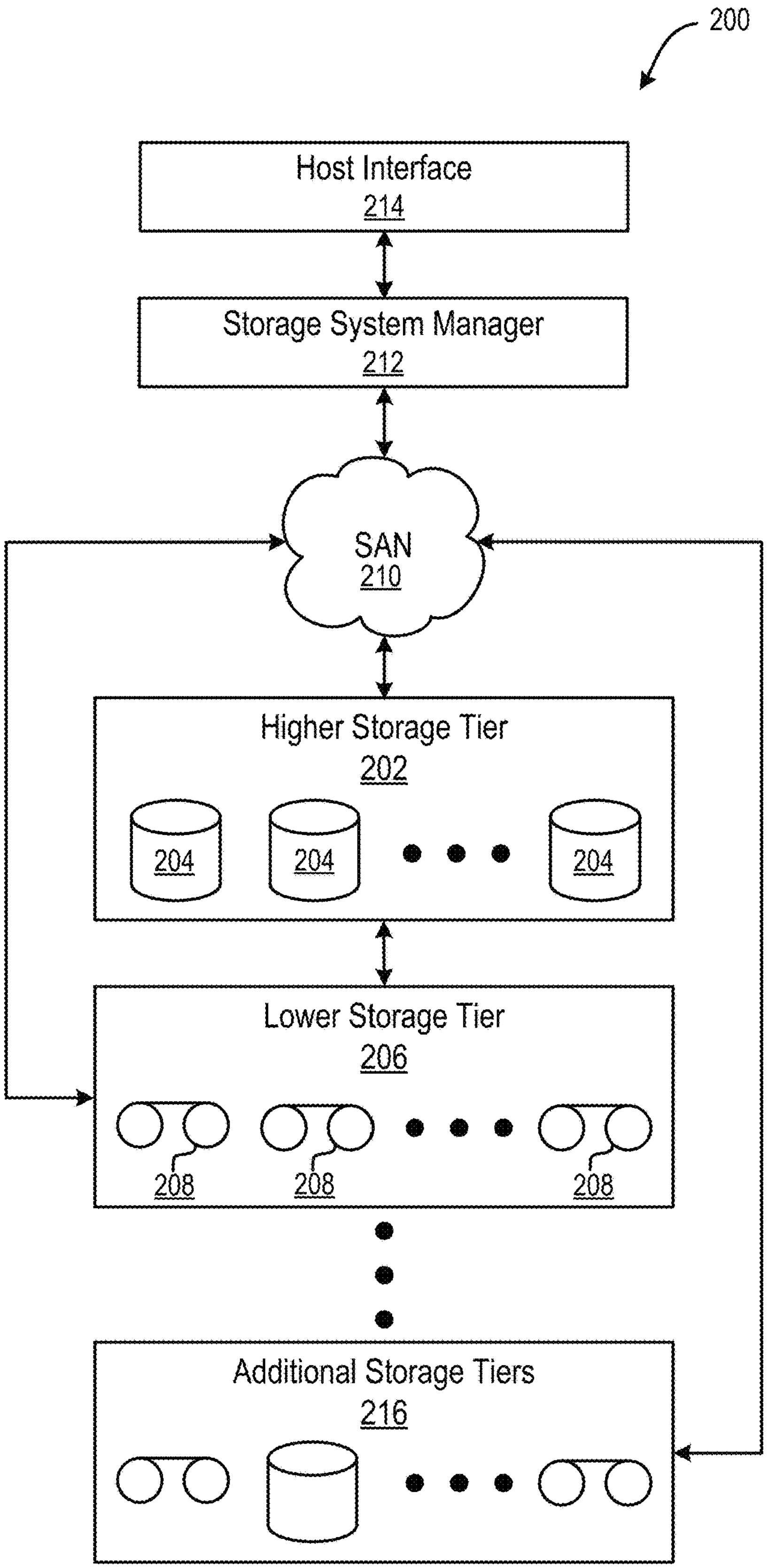
FIG. 2 is a diagram of a tiered data storage system, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for erasing data sets without access delay to other data sets.

In one general embodiment, a method includes causing an erase operation to be performed for a first data set. The erase operation includes blocking accesses to the first data set and to a locational data structure for a first volume of a first direct-access storage device (DASD) that includes the first data set, updating a bitmap of the first DASD to indicate that data tracks of the first data set are to be erased, and providing first data to a server configured to erase the data tracks of the first data set. The erase operation further includes unblocking accesses to the locational data structure for the first volume of the first DASD, where an entry for the first data set is removed from the locational data structure for the first volume of the first DASD prior to the unblocking. The erase operation also includes causing the data tracks of the first data set to be erased by the server during a determined erase period.

In another general embodiment, a computer program product includes one or more computer-readable storage media, and program instructions stored on the one or more storage media to perform the foregoing method.

In another general embodiment, a computer system includes a processor set, one or more computer-readable storage media, and program instructions stored on the one or more storage media to cause the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data set erase code of block 150 for erasing data sets without access delay to other data sets. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

Data is typically stored by data drives as a plurality of bits on data storage devices, e.g., zeros and ones. In some cases, in order to erase such data, memory blocks that store the bits are marked for reclamation, and overwritten by new data. However, in order to satisfy client demands and/or governing practices for data storage, in some cases when a client uses a user device to issue a request for erasing data, e.g., specifies "ERASE(ALL)", all data must be converted to binary zeros when it is deleted. This practice is also known as "erase on scratch". For example, Security Technical Implementation Guides (STIGs) are a principal way that (Defense Information Systems Agency (DISA) works to safeguard Department of Defense (DoD) network resilience and protect government information systems from cybersecurity threats and malicious attacks by strengthening baseline security configurations. Center for Internet Security (CIS) benchmarks are configuration baselines and best practices for securely configuring a system. Each of the guidance recommendations references one or more CIS controls that were developed to help organizations improve their cyber defense capabilities.

Writing binary zeros over the bits of a data set requires input/output (I/O) operations to occur as the data set is deleted, e.g., erasing the data set by replacing the data set with binary zeros. In conventional environments, this writing takes volumes of data offline for at least the duration that the I/O operations are performed. For relatively small data sets, there is hardly a noticeable performance impact in a data storage system, as the write operation is relatively small. However, this is not the case for data sets that are relatively large in size. During writing of binary zeros to these relatively large data sets, performance of data storage systems is compromised, as delays are experienced by users attempting to access volumes of data that store tracks of the data set being deleted. These performance impacts furthermore cause missed Service Level Agreements (SLAs), which is unacceptable to customers.

In sharp contrast to the deficiencies of the techniques described above, the techniques of embodiment and approaches described herein provides a way to utilize Erase on Scratch (EoS) in the background of a data storage environment. In other words, in techniques described herein, e.g., see method 300, an erase of a data set on one or more volumes of a direct-access storage device (DASD) is reserved for a period of relatively low I/O operation activity in a system that includes the DASD. Meanwhile, from a user perspective, the data set is erased upon the request to erase the data being issued. For example, a data set is erased in the background which means that a delete request will see no performance impact when an 'erase' is requested. This alleviates any possible performance impact and missed SLAs. In some approaches, these techniques include maintaining a locational data structure index to keep track of what data needs to be erased. The locational data structure index may be of any known type that would become apparent to one skilled in the art after reading the present disclosure. In one approach, the locational data structure index may be, or be similar to, a volume table of content index "VTOCIX" by INTERNATIONAL BUSINESS MACHINES (IBM)). Records (such as records of activity on a mainframe computer that are then recorded within an index of the locational data structure) are written to track physical data deletion for regulatory compliance. These techniques eliminate the current performance impact of EoS while also meeting the governing data storage requirements, e.g., such as the Security Technical Implementation Guide (STIG), the Center for Internet Security (CIS), etc. These new EoS techniques do not have restrictions on copy services relationships, and only call for an indexed locational data structure, which is an acceptable norm among clients.

Figure 3:
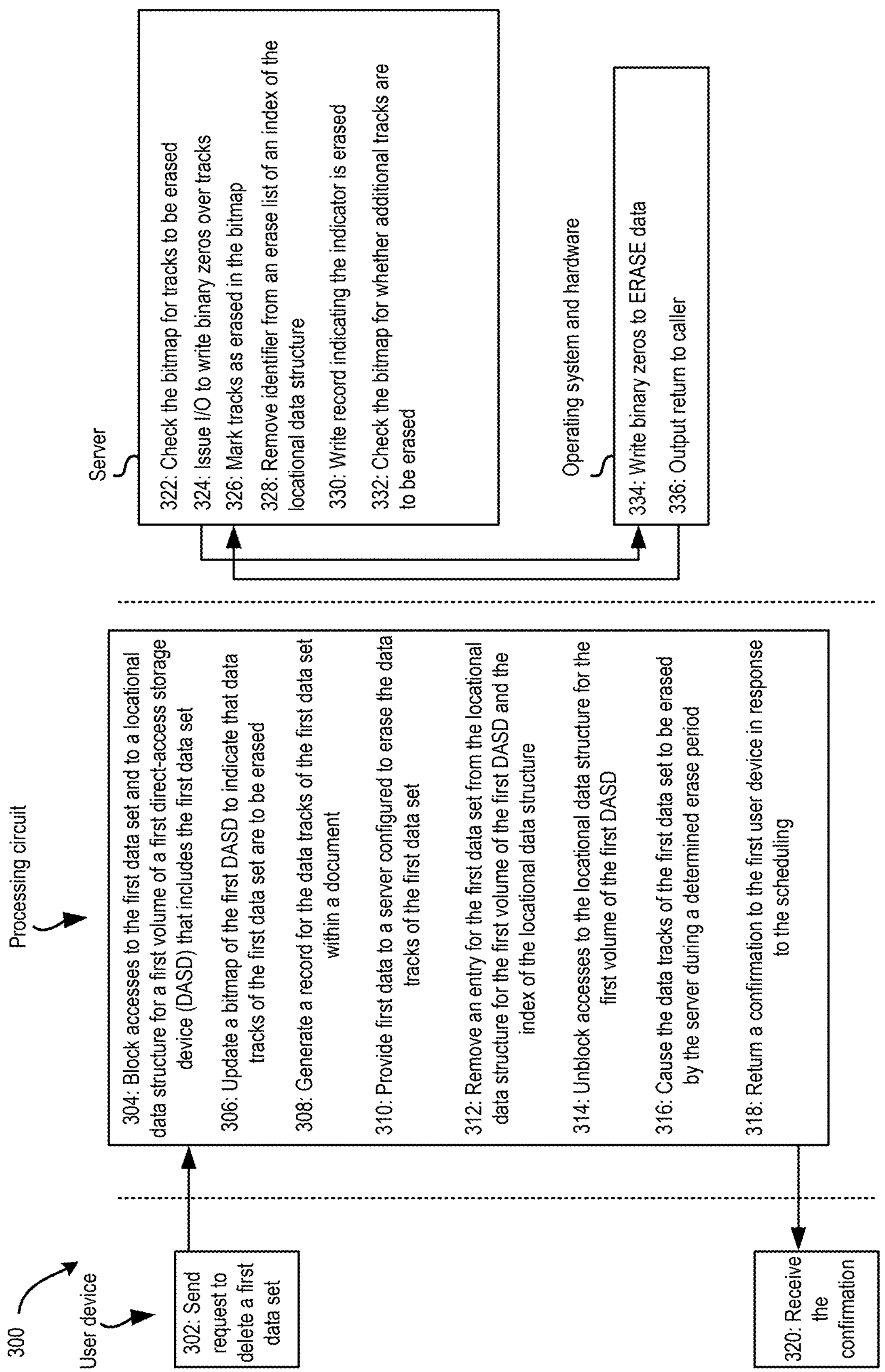
FIG. 3 is a flowchart of a method, in accordance with one embodiment of the present invention.

Now referring to FIG. 3, a flowchart of a method 300 is shown according to one embodiment. The method 300 may be performed in accordance with aspects of the present invention in any of the environments depicted in FIGS. 1-4, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Method 300 includes causing an erase operation (on scratch) to be performed for a first data set. In some approaches, the erase operation of caused to be performed by a processing circuit that is configured to execute operations described herein. Furthermore, in some approaches, the erase operation may be caused to be performed in response to receiving, e.g., at the processing circuit, a request that is sent from a first user device, e.g., see operation 302. The request may specify that a first data set is to be erased.

In some approaches, the first data set is managed using the first user device. The request to delete the first data set may specify that the first data set is to be erased, e.g., binary zeros are to be written over tracks of data of the first data set in order to comply with governing data storage requirements and/or service agreements.

A data storage environment within which the first data set is stored may operate in such a way that data of data sets are written on one or more volumes of data. The data storage environment may include one or more direct-access storage devices (DASDs), and the data may be accessed by use of a locational data structure. For context, the locational data structure may serve as an index for data tracks of the data sets stored in the data storage environment. Other locational data structures may be of any known type that would become apparent to one skilled in the art after reading the present disclosure. In one approach, the locational data structure may be, or be similar to, a volume table of content "VTOC" by IBM. More specifically, an index of the locational data structure may be referenced to determine the volume(s) of the DASD that include data track(s) of a first data set that are requested to be erased by the first user device. Accordingly, in some use cases described herein, user devices need access to the locational data structure, and more specifically entries of the locational data structure, to access one or more data sets.

In some preferred approaches, the erase operation includes blocking accesses (accesses by user devices) to the first data set and to a locational data structure for a first volume of a first DASD that includes the first data set, e.g., see operation 304. Note that, although descriptions herein refer to a single DASD, e.g., the first DASD, in some other approaches, the erase operation may be performed with respect to a second data set that is stored across a plurality of volumes of a plurality of different DASDs. In at least some of such approaches, multiple locational data structures are also used.

The preventing accesses to the first data set and to the locational data structure for the first DASD volume, in some approaches, includes issuing an enqueue on a system that is configured to maintains locational data structures for DASD volumes. The accesses to the first data set and to the locational data structure for the first DASD volume may additionally and/or alternatively be prevented by issuing an enqueue on a function that is used to determine whether a specified data set is available for use. Such a function may be of any known type that would become apparent to one skilled in the art after reading the present disclosure. In one approach, the function may be, or be similar to, a SYSDSN and SYSVTOC by IBM. More specifically, in such an approach, the SYSDSN is the enqueue on the 'first data set' and the SYSVTOC is the enqueue on the "locational data structure for the first DASD volume".

Operation 306 includes updating a bitmap of the first DASD to indicate that data tracks of the first data set are to be erased. For context, in addition to the bitmap of the first DASD being a data structure that provides a way of locating the data sets that reside on a particular DASD volume, the bitmap may additionally and/or alternatively be used to determine which data tracks of volumes of the first DASD to erase during a determined erase period. For example, by maintaining bits for each of the data tracks of the volumes of the first DASD, the bits may be marked in a way that indicates whether data of associated data tracks is to be erased. More specifically, the maintaining may, in some approaches, include setting the bits of a first portion of the data tracks to a first value (zero) in response to a determination that the data of the first portion of the data tracks is not to be erased and setting the bits a second portion of the data tracks to a second value (one) in response to a determination that the data of the second portion of the data tracks is to be erased. It should be noted that the bitmap may also be referred to herein as "an indexed volume table of contents (VTOCIX) erase space map".

In some approaches, in order to enable hardware, e.g., see "Operating system and hardware", of a data storage environment to erase the first data set, predetermined types of data (hereafter referred to as "first data") may be prepared and/or provided to a server configured to erase the data tracks of the first data set. The providing the first data to the server configured to erase the data tracks of the first data set, in some approaches, includes preparing a storage location for the first data. This preparation may, in some approaches, include generating (e.g., see operation 308) a record for the data tracks of the first data set within an index of the locational data structure, e.g., a VTOCIX list of erase data sets. The first data may be added to the record, where the first data may include types of information that detail when and/or how to delete a data set that is to be erased, e.g., the first data set. For example, the first data may, in some approaches, include a requested delete time of the data set, a time that an erase of the data tracks of a data set that is to be erased is completed, a data set name, identifiers of tracks that have been erased, a job name, a step name, and a description of a dataset that a program uses when run, etc. The description of a dataset that a program uses when run may be of any known type that would become apparent to one skilled in the art after reading the present disclosure. In one approach, the description of a dataset that a program uses when run may be, or be similar to, a dd name by IBM. The first data may additionally and/or alternatively include other pertinent information of a type that would become apparent to one of ordinary skill in the art after reading the descriptions herein. The first data (or allowing access to the associated record thereof) is output to the server, in some approaches, e.g., see operation 310.

Although this provisioning of the data may, in some approaches, be of any known type that would become apparent to one skilled in the art after reading the present disclosure, in some use case examples, this preparation and providing of the data to the server may include passing system management facility (SMF) data to a device management server (DEVMAN) by IBM.

Operation 312 includes removing an entry for the first data set from the locational data structure for the first volume of the first DASD and the index of the locational data structure. By removing the entry for the first data set from the locational data structure for the first volume of the first DASD and the index of the locational data structure, the entry for the first data set is thereafter not displayed on the locational data structure and index thereof. Without these removals, user devices would otherwise see and/or be able to locate the first data set once the locational data structure for the first volume of the first DASD is unblocked. In other words, these removals enable data of the first data set to be set for erasing on the backend perspective of the data storage environment (within physical storage where the details of such storage are unknown to user devices), while from a frontend perspective of the data storage environment, the existence of the data of the first data set is already erased (as the entry for the first data set no longer appears in the locational data structure for the first volume of the first DASD and the index of the locational data structure).

Operation 314 includes unblocking accesses (accesses by user devices) to the locational data structure for the first volume of the first DASD. The first user device is, in some approaches, able to access a second data set located on the first volume of the first DASD based on the accesses to the locational data structure for the first volume of the first DASD being unblocked.

In some approaches, unblocking accesses by user devices to the locational data structure for the first volume of the first DASD includes issuing, a dequeue on the system that maintains locational data structures for DASD volumes to allow others access to the volume.

In some preferred approaches, the entry for the first data set is removed from the locational data structure for the first volume of the first DASD prior to the unblocking. As mentioned above, based on this removal being performed before the locational data structure for the first volume of the first DASD becomes available for user devices, user devices are never able to access data sets that are set to be erased and are never able to identify that such data sets still exist in volumes of the data storage environment. Numerous performance benefits are enabled by using the techniques described herein to not restrict access to the locational data structure for the first volume of the first DASD until the data tracks of the first data set are erased. For example, by not restricting access to the locational data structure for the first volume of the first DASD until the data tracks of the first data set are erased, use of the locational data structure for other volume(s) of the first DASD are enabled. It should be noted that this use of the locational data structure for other volume(s) of the first DASD is not otherwise enabled in conventional data storage environments which, as described elsewhere above, compromise performance of conventional data storage environments by taking volumes of data offline for at least the duration that I/O operations take to write zeros to a data set that is to be deleted. Accordingly, the techniques described herein increase I/O workload efficiency and performance of data storage environments.

Operation 316 includes causing the data tracks of the first data set to be erased by the server (operating system and/or hardware of the server) during a determined erase period. The causing the data tracks of the first data set to be erased by the server during the determined erase period, in some approaches, includes causing binary zeros to be written over the data tracks of the first data set during the determined erase period. In some approaches, this may be caused by issuing an instruction, to the server, to write binary zeros over the data tracks of the first data set during the determined erase period.

The determined erase period may occur at different times for different use cases. However, in some preferred approaches, the data tracks of the first data set are erased while accesses to the locational data structure for the first volume of the first DASD are unblocked. In other words, the erase operation of method 300 performed in order to erase the first data set does not, during the writing of binary zeros, restrict access to the locational data structure for the first volume of the first DASD. Techniques for determining the erase period are described below.

In some approaches, method 300 includes determining the erase period for the data tracks of the first data set. In order to reduce a workload of the system during period of relatively peak I/O operations, in some approaches, the determined erase period for the data tracks of the first data set is a period of time in which I/O operations of the first DASD is forecasted to be less than a predetermined threshold. Historical forecasting techniques of a type that would become apparent to one of ordinary skill in the art after reading the descriptions herein may be used. In some other approaches, a period of time in which I/O operations of the first DASD is forecasted to be less than the predetermined threshold may be determined to not exist. In response to such a determination, a backup erase period may be used. The backup erase period may be selected, e.g., during a random period of time, during a relatively lowest period of I/O operations of the first DASD, immediately subsequent to another write operation performed by the first DASD, etc.

In some approaches, the determined erase period exists after the unblocking (where the locational data structure no longer includes entries for the data tracks of the first data set to be erased but the tracks of the first data set to be erased are still located on the first volume of the first DASD).

In order to cause the data tracks of the first data set to be erased by the server during a determined erase period, in some approaches, method 300 additionally and/or alternatively includes scheduling the data tracks of the first data set to be caused to be erased by the server during the determined erase period. This scheduling may be performed by adding an entry in a workload queue of the first DASD.

The first user device (that requested to erase the first data set) may be provided with an update once the first data set is scheduled to be erased and/or once the first data set is erased. For example, operation 318 includes returning a confirmation to the first user device in response to the scheduling. The confirmation is received by the first user device in operation 320. More specifically, in some approaches, the confirmation is returned to the first user device while the data tracks of the first data set are still located on the first volume of the first DASD but after the bitmap of the first DASD is updated to indicate that the data tracks of the first data set are to be erased No compromising performance impact is experienced on the data storage system in which method 300 is performed, because normal access to volumes of the DASD does not wait for I/O operations (binary zeros) to complete to proceed.

Operations of method 300 enable the data tracks of the first data set to be erased by the server during a determined erase period. These operations may be performed on the processing circuit performing method 300, in some approaches. These operations may, in some approaches, include instructing the server described herein to perform operations as will be described in some approaches below.

In some approaches, the processing circuit may enable the server to write binary zeros to the data tracks of the first data set based on the first data being provided to the server (e.g., see operation 310). The server may monitor for such data over time, e.g., see operation 322 in which the server checks the bitmap indications of tracks that are to be erased. An indication of the determined erase period may also be provided to the server by the processing circuit, and, at the determined erase period, an I/O command may be issued by the server to an operating system and hardware configured to perform the write, e.g., see operation 324. Operation 326 includes marking tracks as erased in the bitmap subsequent to the erase being performed. Operation 328 includes removing identifier(s) from an erase list of the index of the locational data structure. For example, in one approach, the identifier(s) may include a data set name from a VTOCIX erase list. A record indicating that the dataset name is erased may be written in operation 330, e.g., an SMF record indicating the data set name is erased. Operation 332 includes checking the bitmap for whether additional tracks are to be erased.

In operation 334, the operations system and hardware write binary zeros to erase a data set that is to be erased, e.g., the first data set. Operation 336 includes outputting a return to a caller, e.g., the first user device. This return may, in some approaches, be received by the processing circuit, and be output by the processing circuit to the caller (the user device).

Various techniques for using the storage space (data tracks of the volumes of the first DASD that were previously used for the first data set) subsequent to the erase operation of method 300 being performed for erasing the first data set are described in method 400.

Figure 4:
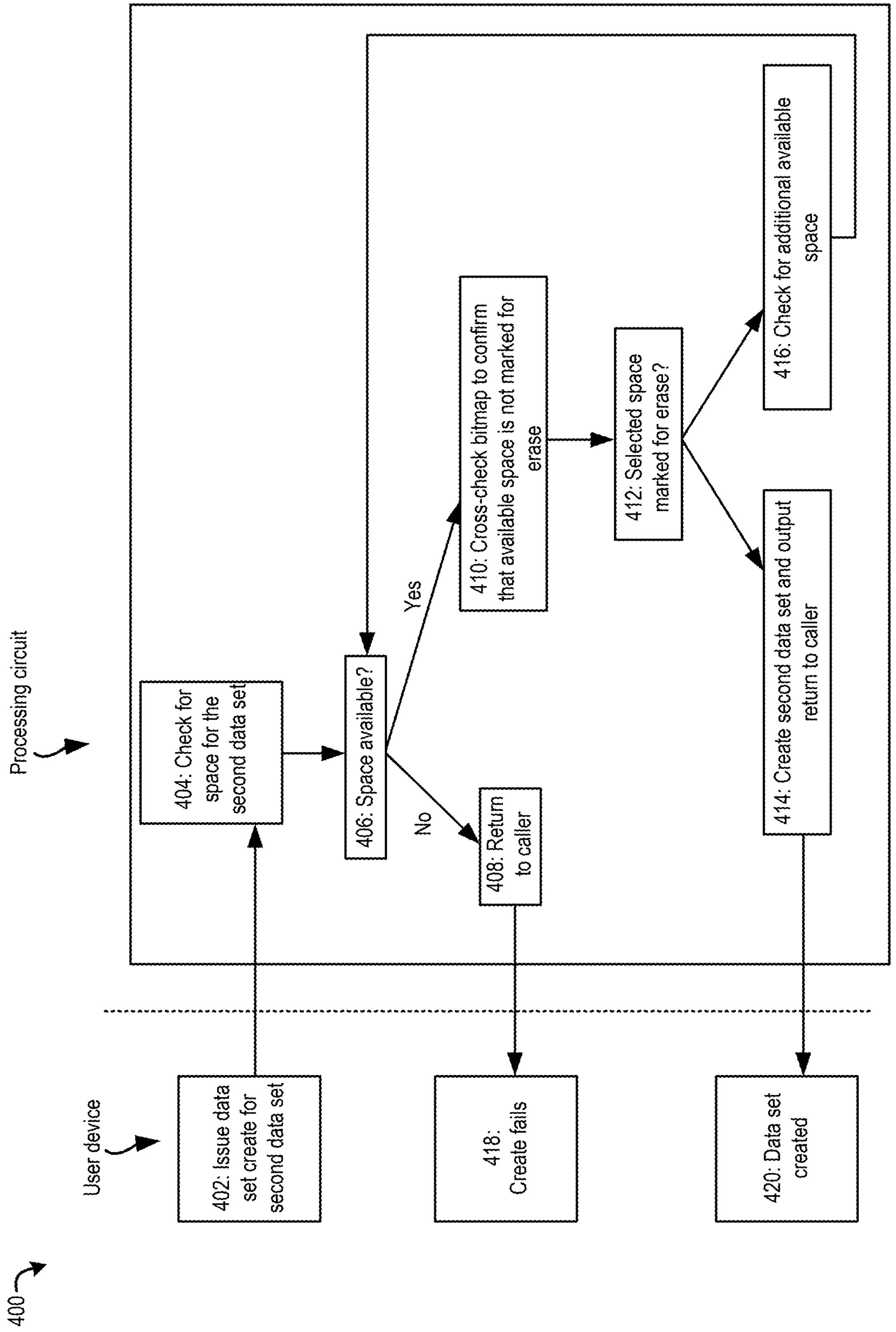
FIG. 4 is a flowchart of a method, in accordance with one embodiment of the present invention.

Now referring to FIG. 4, a flowchart of a method 400 is shown according to one embodiment. The method 400 may be performed in accordance with aspects of the present invention in any of the environments depicted in FIGS. 1-4, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

In some approaches, method 400 includes causing a write operation on scratch to be performed for a second data set. The write operation may be, in some approaches, at least initiated (by a processing circuit performing method 400) in response to receiving, from a second user device, a request to store the second data set. Accordingly, in one or more of such approaches, the write operation includes receiving, from a second user device, a request to store the second data set, e.g., see operation 402.

In response to receiving the request to store the second data set, a check may be performed for determining whether space is available for storing the second data set, e.g., see operation 404. More specifically, in some approaches, a determination is made as to whether space is available on volume(s) of the first DASD for the second data set, e.g., see operation 406. Space check techniques that would become apparent to one of ordinary skill in the art after reading the descriptions herein may be used to perform the determination. In some approaches, the determination as to whether space is available on volume(s) of the first DASD for the second data set may be made by checking whether the server has performed a write operation to erase data relatively more recently than the server has performed a write operation to write a data set.

In response to a determination that space is available on the first DASD (and more specifically volume(s) of the first DASD in some approaches) for the second data set, cross-checking the bitmap of the first DASD to confirm that the available space on the first DASD does not include the data tracks of the first data set that are to be erased.

In response to a determination that space is not available on the first DASD (as illustrated by the "No" logical path of operation 406), a return may be issued by the processing circuit to the second user device to inform the second user device that creation of the second data set has failed based on a lack of available storage space, e.g., see return operation 408 issued by the processing circuit then received by the second user device in operation 418. In contrast, in response to a determination that space is available on the first DASD (as illustrated by the "Yes" logical path of operation 406), the write operation comprises performing a cross-checking operation to confirm that the available space on the first DASD does not include the data tracks of the first data set that are (marked in the bitmap) to be erased, e.g., see operation 410 and operation 412.

In response to a determination that the cross-checking of the bitmap confirms that the available space on the first DASD does not include the data tracks of the first data set that are to be erased, the second data set is caused to be created and a confirmation is returned to the second user device, e.g., see operation 414 and operation 420. In some approaches, the second data set is caused to be created by issuing an instruction to the server to perform a write operation that includes writing the second data set to the available space on the first DASD. In contrast, in some approaches, in response to a determination that the cross-checking of the bitmap reveals that the available space on the first DASD includes the data tracks of the first data set that are to be erased, method 400 includes checking for additional storage space for the second data set, e.g., see operation 416. For example, additional storage space for the second data set may be performed on a second DASD, within the first volume, on other volumes, etc.

Although approaches described herein may be deployed in any type of data storage environment that would become apparent to one skilled in the art after reading the present disclosure, in one use case example performed within a data storage infrastructure that deploys a VTOC by IBM, an embodiment may be performed in conjunction with a data set that is deleted with ERASE specified. A new VTOCIX space map and data area for ERASE may be updated with tracks and a data set name to be erased. A DEVMAN may, in some approaches, be called to schedule the ERASE. Furthermore, catalog, VTOC, and VTOCIX entries are deleted, thereby rendering the delete complete from a user point of view. Meanwhile the ERASE occurs in DEVMAN address space at a determined erase period based on I/O threshold settings.

In some approaches, input receive from a user device that specifies an 'erase by' time may be used to determine the erase period. In one or more of these approaches, a default erase period includes the erase being performed within and/or at twenty-four hours from the time that the request to delete the data set is received. In some other approaches, the erase period may additionally and/or alternatively be determined using predictive analysis via RMF and SMF data. For example, the DEVMAN may be instructed to determine windows of relatively lowest I/O activity and schedule the erase to take place within the determined window to meet 'erase by' settings.

Thereafter, the ERASE completes, and a SMF record is written to a document. This record may, in some approaches, include data such as, e.g., a time the delete is requested, a time the erase completed, a data set name, tracks erased, job name, step name, dd name, and/or other pertinent information.

The VTOCIX is, in some approaches, then updated to remove data set name from data area and tracks to be erased from space map.

Some approaches utilize a set of macros and/or tasks that allow users to use user devices to access a DASD bitmap and an index of the bitmap. These macros and/or tasks may be of a type that would become apparent to one skilled in the art after reading the present disclosure. One or more of these approaches may utilize common VTOC access facility (CVAF) by IBM to check a new ERASE space map when allocating storage. This may check the VTOC pack space map (VPSM) to find available space on the volumes, and additionally check the ERASE space map to ensure the selected tracks/cylinders are not marked for ERASE. In response to a determination that the selected tracks are marked to be erased, the CVAF may return back to the VPSM and find the next available space and so on until space is found that is both available in the VPSM and not marked for erase in the ERASE space map. This is important to ensure that residual data is not accessible through new data set allocations.

In response to a determination that the space allocation fails due to tracks waiting to be erased, a message is, in some approaches, issued asking the user if they would like the erase to occur immediately rather than waiting for the 'erase by' time. This message also lists the current 'erase by' setting and the description may suggest altering the settings to avoid allocations failing due to waiting on erases to complete.

In response to a determination that a volume's VTOCIX is disabled, the DEVMAN may be caused to continue to erase tracks in its queue, and will still have access to the VTOCIX to update the ERASE space map. However, if a delete is issued from a user device with ERASE specified, the method may revert back to conventional EoS until the VTOCIX is rebuilt. In response to a determination that the VTOCIX is rebuilt, the ERASE space map and erase data area with the list of data sets to be erased remain as-is (because they are managed by DEVMAN). When DEVMAN's erase queue is empty, the DEVMAN may be caused to check the ERASE space map for any bits that may still need to be erased. These tracks are caused to be erased using techniques described herein (see method 300) and the space map is updated accordingly. These erases are preferably recorded in SMF records and have DEVMAN as the data set name and job name. Because CVAF checks the ERASE space map before allocating space, these tracks will never be selected until they are removed.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

causing an erase operation to be performed for a first data set, wherein the erase operation is caused to be performed in response to receiving, from a first user device, a request to erase the first data set, the erase operation including:

blocking accesses to the first data set and to a locational data structure for a first volume of a first direct-access storage device (DASD) that includes the first data set;

updating a bitmap of the first DASD to indicate that data tracks of the first data set are to be erased;

providing first data to a server configured to erase the data tracks of the first data set;

unblocking accesses to the locational data structure for the first volume of the first DASD, wherein an entry for the first data set is removed from the locational data structure for the first volume of the first DASD prior to the unblocking;

determining an erase period for the data tracks of the first data set, wherein the determined erase period for the data tracks of the first data set is a period of time in which input/output (I/O) operations of the first DASD is forecasted to be less than a predetermined threshold;

scheduling the data tracks of the first data set to be caused to be erased by the server during the determined erase period;

returning a confirmation to the first user device in response to the scheduling; and causing the data tracks of the first data set to be erased by the server during the determined erase period.

2. The method of claim 1, wherein the determined erase period exists after the unblocking, wherein the confirmation is returned to the first user device while the data tracks of the first data set are still located on the first volume of the first DASD but after the bitmap of the first DASD is updated to indicate that the data tracks of the first data set are to be erased.

3. The method of claim 2, wherein the first user device is able to access a second data set located on the first volume of the first DASD based on the accesses to the locational data structure for the first volume of the first DASD being unblocked.

4. The method of claim 1, wherein the causing the data tracks of the first data set to be erased by the server during the determined erase period comprises: issuing an instruction, to the server, to write binary zeros over the data tracks of the first data set during the determined erase period.

5. The method of claim 1, wherein the providing the first data to the server configured to erase the data tracks of the first data set comprises:

generating a record for the data tracks of the first data set within an index of the locational data structure;

adding the first data to the record, wherein the first data is selected from the group consisting of: a requested delete time, a time that an erase is completed, a data set name, identifiers of tracks that have been erased, a job name, a step name, and a description of a dataset that a program uses when run; and outputting the first data to the server.

6. The method of claim 1, further comprising:

causing a write operation to be performed for a second data set, the write operation comprising:

receiving, from a second user device, a request to store the second data set; and in response to a determination that space is available on the first DASD for the second data set, cross-checking the bitmap of the first DASD to confirm that the available space on the first DASD does not include the data tracks of the first data set that are to be erased.

7. The method of claim 6, wherein the write operation comprises:

in response to a determination that the cross-checking of the bitmap confirms that the available space on the first DASD does not include the data tracks of the first data set that are to be erased, causing the second data set to be created and returning a confirmation to the second user device; and in response to a determination that the cross-checking of the bitmap reveals that the available space on the first DASD includes the data tracks of the first data set that are to be erased, checking for additional storage space for the second data set.

8. A computer program product comprising:

one or more computer-readable storage media; and program instructions stored on the one or more storage media to perform operations comprising:

causing an erase operation to be performed for a first data set, wherein the erase operation is caused to be performed in response to receiving, from a first user device, a request to erase the first data set, the erase operation including:

blocking accesses to the first data set and to a locational data structure for a first volume of a first direct-access storage device (DASD) that includes the first data set;

updating a bitmap of the first DASD to indicate that data tracks of the first data set are to be erased;

providing first data to a server configured to erase the data tracks of the first data set;

unblocking accesses to the locational data structure for the first volume of the first DASD, wherein an entry for the first data set is removed from the locational data structure for the first volume of the first DASD prior to the unblocking;

determining an erase period for the data tracks of the first data set, wherein the determined erase period for the data tracks of the first data set is a period of time in which input/output (I/O) operations of the first DASD is forecasted to be less than a predetermined threshold;

scheduling the data tracks of the first data set to be caused to be erased by the server during the determined erase period;

returning a confirmation to the first user device in response to the scheduling; and causing the data tracks of the first data set to be erased by the server during the determined erase period.

9. The computer program product of claim 8, wherein the determined erase period exists after the unblocking, wherein the confirmation is returned to the first user device while the data tracks of the first data set are still located on the first volume of the first DASD but after the bitmap of the first DASD is updated to indicate that the data tracks of the first data set are to be erased.

10. The computer program product of claim 9, wherein the first user device is able to access a second data set located on the first volume of the first DASD based on the accesses to the locational data structure for the first volume of the first DASD being unblocked.

11. The computer program product of claim 8, wherein the causing the data tracks of the first data set to be erased by the server during the determined erase period comprises: issuing an instruction, to the server, to write binary zeros over the data tracks of the first data set during the determined erase period.

12. The computer program product of claim 8, wherein the providing the first data to the server configured to erase the data tracks of the first data set comprises:

generating a record for the data tracks of the first data set within an index of the locational data structure;

adding the first data to the record, wherein the first data is selected from the group consisting of: a requested delete time, a time that an erase is completed, a data set name, identifiers of tracks that have been erased, a job name, a step name, and a description of a dataset that a program uses when run; and outputting the first data to the server.

13. The computer program product of claim 8, wherein the operations further comprise:

causing a write operation to be performed for a second data set, the write operation comprising:

receiving, from a second user device, a request to store the second data set; and in response to a determination that space is available on the first DASD for the second data set, cross-checking the bitmap of the first DASD to confirm that the available space on the first DASD does not include the data tracks of the first data set that are to be erased.

14. The computer program product of claim 13, wherein the write operation comprises:

in response to a determination that the cross-checking of the bitmap confirms that the available space on the first DASD does not include the data tracks of the first data set that are to be erased, causing the second data set to be created and returning a confirmation to the second user device; and in response to a determination that the cross-checking of the bitmap reveals that the available space on the first DASD includes the data tracks of the first data set that are to be erased, checking for additional storage space for the second data set.

15. A computer system comprising:

a processor set;

one or more computer-readable storage media; and program instructions stored on the one or more storage media to cause the processor set to perform operations comprising:

causing an erase operation to be performed for a first data set, wherein the erase operation is caused to be performed in response to receiving, from a first user device, a request to erase the first data set, the erase operation including:

blocking accesses to the first data set and to a locational data structure for a first volume of a first direct-access storage device (DASD) that includes the first data set;

updating a bitmap of the first DASD to indicate that data tracks of the first data set are to be erased;

providing first data to a server configured to erase the data tracks of the first data set;

unblocking accesses to the locational data structure for the first volume of the first DASD, wherein an entry for the first data set is removed from the locational data structure for the first volume of the first DASD prior to the unblocking;

determining an erase period for the data tracks of the first data set, wherein the determined erase period for the data tracks of the first data set is a period of time in which input/output (I/O) operations of the first DASD is forecasted to be less than a predetermined threshold;

scheduling the data tracks of the first data set to be caused to be erased by the server during the determined erase period;

returning a confirmation to the first user device in response to the scheduling; and causing the data tracks of the first data set to be erased by the server during the determined erase period.

16. The computer system of claim 15, wherein the causing the data tracks of the first data set to be erased by the server during the determined erase period comprises: issuing an instruction, to the server, to write binary zeros over the data tracks of the first data set during the determined erase period.

17. The computer system of claim 15, wherein the providing the first data to the server configured to erase the data tracks of the first data set comprises:

generating a record for the data tracks of the first data set within an index of the locational data structure;

adding the first data to the record, wherein the first data is selected from the group consisting of: a requested delete time, a time that an erase is completed, a data set name, identifiers of tracks that have been erased, a job name, a step name, and a description of a dataset that a program uses when run; and outputting the first data to the server.

* * * * *